US008295845B1

United States Patent
Abdollahi-Alibeik et al.

(10) Patent No.: US 8,295,845 B1
(45) Date of Patent: Oct. 23, 2012

(54) TRANSCEIVER I/Q MISMATCH CALIBRATION

(75) Inventors: Shahram Abdollahi-Alibeik, Santa Clara, CA (US); Bemini Hennadige Janath Peiris, Sunnyvale, CA (US)

(73) Assignee: Qualcomm Atheros, Inc., San Jose, CA (US)

(*) Notice: Subject to any disclaimer, the term of this patent is extended or adjusted under 35 U.S.C. 154(b) by 788 days.

(21) Appl. No.: 12/328,128

(22) Filed: Dec. 4, 2008

(51) Int. Cl.
 *H04W 40/10* (2009.01)
(52) U.S. Cl. ............... 455/445; 455/63.1; 455/226.1
(58) Field of Classification Search .................. 455/445
 See application file for complete search history.

(56) References Cited

U.S. PATENT DOCUMENTS

| 7,003,263 | B2* | 2/2006 | Fischer et al. ............... 455/63.1 |
| 7,251,291 | B1 | 7/2007 | Dubuc et al. |
| 7,593,484 | B2 | 9/2009 | Beamish et al. |
| 2006/0141969 | A1 | 6/2006 | Dubash et al. |
| 2007/0153877 | A1 | 7/2007 | Siwiak |
| 2007/0189371 | A1* | 8/2007 | Yen .............................. 375/219 |
| 2009/0034651 | A1 | 2/2009 | Lan et al. |
| 2010/0015936 | A1* | 1/2010 | Mo et al. ..................... 455/226.1 |
| 2010/0066994 | A1 | 3/2010 | Petrov et al. |

OTHER PUBLICATIONS

Behzad, A. et al., "A Fully Integrated MIMO Multi-Band Direct-Conversion CMOS Transceiver for WLAN Applications (802.11n)", *International Solid-State Circuits Conference (ISSCC) 2007 Digest of Technical Papers* Feb. 2007, pp. 560-561, 622.

Behzad, A. et al., "A Fully Integrated MIMO Multi-Band Direct-Conversion CMOS Transceiver for WLAN Applications (802.11n)", *International Solid-State Circuits Conference (ISSCC) 2007 Digest of Technical Papers* 2007, pp. 462-463, 765.

Craninckx, J. et al., "A WLAN direct up-conversion mixer with automatic image rejection calibration", *Solid-State Circuits Conference, 2005. Digest of Technical Papers. ISSCC. 2005 IEEE International* Feb. 2005, pp. 546-547, 616.

Hsieh, Yong-Hsiang et al., "An auto-I/Q calibrated CMOS transceiver for 802.11g", *Solid-State Circuits, IEEE Journal* 2005, pp. 92-93.

Co-pending U.S. Appl. No. 12/562,997, filed Sep. 18, 2009.
Co-pending U.S. Appl. No. 12/779,595, filed May 13, 2010.
"U.S. Appl. No. 12/562,997 Office Action", Dec. 20, 2011, 6 pages.
"U.S. Appl. No. 12/779,595", Office Action, Feb. 16, 2012, 19 pages.

\* cited by examiner

*Primary Examiner* — Duc Nguyen
*Assistant Examiner* — Ajibola Akinyemi
(74) *Attorney, Agent, or Firm* — DeLizio Gilliam, PLLC

(57) ABSTRACT

A calibration mechanism is disclosed for performing I/Q mismatch calibration operations in a wireless communication device comprising a receiver unit and a transmitter unit. During an I/Q mismatch calibration mode, a first signal and a second signal are provided from the transmitter unit to the receiver unit via a loopback path coupled between the transmitter and receiver units. A phase shift is added to the second signal that is provided to the receiver unit. A first set of I/Q measurements is determined from the first signal and a second set of I/Q measurements is determined from the second signal with the added phase shift. Transmitter and receiver I/Q mismatch parameters are calculated based on the first and second sets of I/Q measurements. The receiver and transceiver I/Q mismatch parameters are used to compensate for I/Q mismatch at the receiver and transmitter units, respectively.

16 Claims, 6 Drawing Sheets

US 8,295,845 B1

TRANSCEIVER I/Q MISMATCH CALIBRATION

BACKGROUND

Embodiments of the inventive subject matter generally relate to the field of wireless communication systems, and, more particularly, to techniques for transceiver I/Q mismatch calibration.

In wireless communication devices, such as wireless local area network (WLAN) devices, various signal impairments can affect the quality of the transmitted and received wireless signals. For example, mismatched active and passive elements found in the I/Q (in-phase/quadrature) paths of wireless transmitters and receivers may introduce I/Q mismatch errors in the transmitted and received signals of the wireless communication devices. I/Q mismatch errors can include phase mismatch and gain mismatch errors.

SUMMARY

Various embodiments are disclosed of an apparatus and method for performing I/Q mismatch calibration in a wireless communication device comprising a receiver unit and a transmitter unit. In one embodiment, during an I/Q mismatch calibration mode, a first signal and a second signal are provided from the transmitter unit to the receiver unit of the wireless communication device via a loopback path coupled between the transmitter unit and receiver unit. A phase shift is added to the second signal that is provided to the receiver unit. A first set of I/Q measurements is determined from the first signal and a second set of I/Q measurements is determined from the second signal with the added phase shift. Transmitter I/Q mismatch parameters and receiver I/Q mismatch parameters are calculated based on the first and second sets of I/Q measurements. Furthermore, during a normal operational mode, signals that are processed by the transmitter unit can be pre-distorted based on the transmitter I/Q mismatch parameters to compensate for I/Q mismatch at the transmitter unit. Also, during the normal operational mode, signals that are received by the receiver unit can be processed based on the receiver I/Q mismatch parameters to compensate for I/Q mismatch at the receiver unit.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
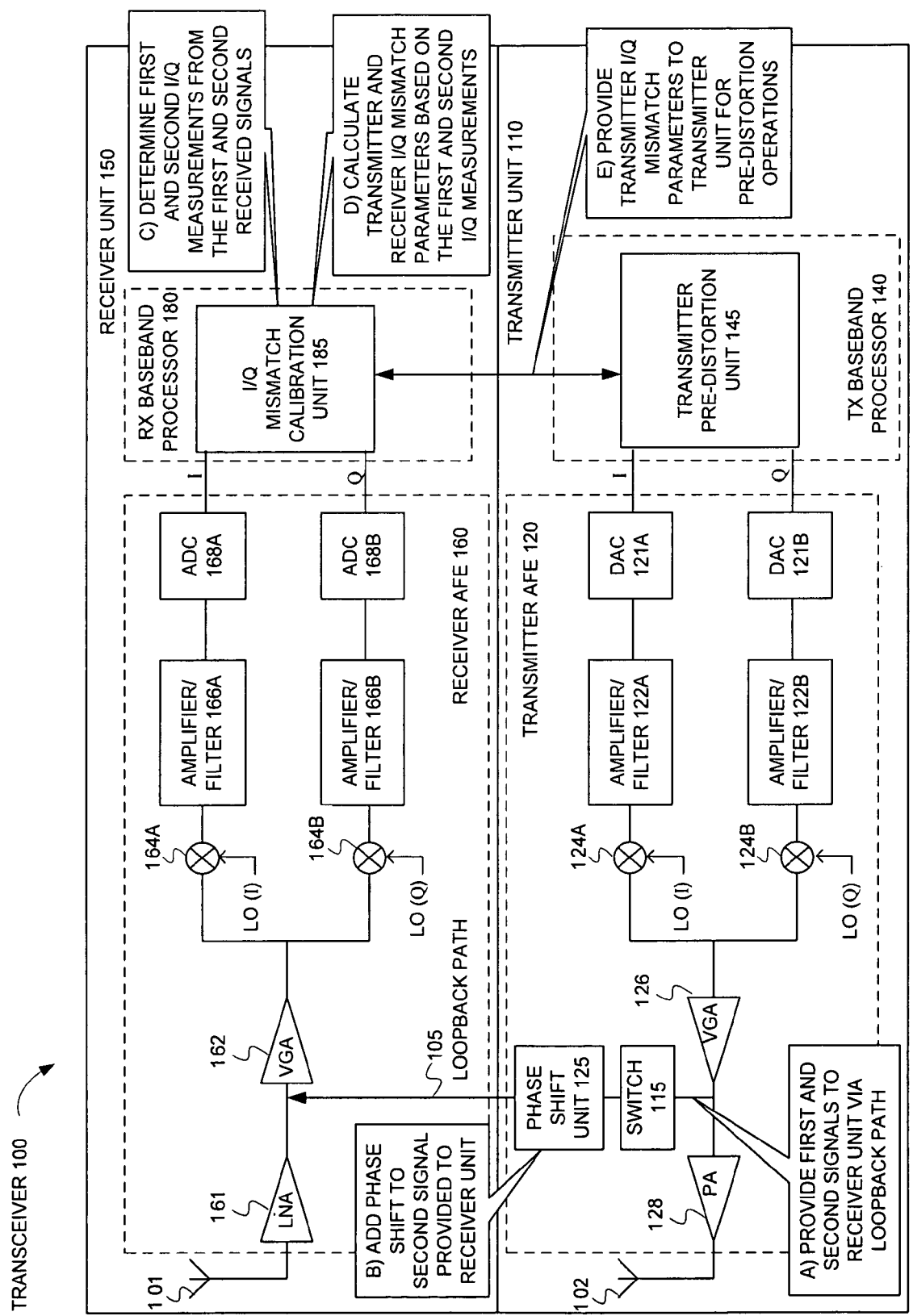
FIG. 1 is an example block diagram of a transceiver operable to implement a technique for I/Q mismatch calibration.

FIG. 1 is an example block diagram of a transceiver 100 operable to implement a technique for I/Q mismatch calibration. The transceiver 100 may be included within a wireless communication device, such as a WLAN device (e.g., the WLAN device 500 of FIG. 5). As illustrated, the transceiver 100 includes a transmitter unit 110 and a receiver unit 150. A loopback path 105 is coupled between the transmitter unit 110 and the receiver unit 150 in the analog front end (AFE) or RF portion of the transceiver 100. The loopback path 105 is utilized during a calibration mode of the transceiver 100 to perform I/Q mismatch calibration operations.

In various embodiments, the transmitter unit 110 includes an antenna 102, a transmitter AFE 120, and a transmitter baseband processor 140. The receiver unit 150 includes an antenna 101, a receiver AFE 160, and a receiver baseband processor 180. In the example shown in FIG. 1, the transmitter AFE 120 includes a digital-to-analog converter (DAC) 121A for the I signal path, amplifier/filter circuitry 122A for the I signal path, a local oscillator (LO) mixer 124A for the I signal path, a DAC 121B for the Q signal path, amplifier/filter circuitry 122B for the Q signal path, an LO mixer 124B for the Q signal path, a variable gain amplifier (VGA) 126, and a power amplifier (PA) 128. The transmitter baseband processor 140 includes a transmitter pre-distortion unit 145. The receiver AFE 160 includes a low-noise amplifier (LNA) 161, a VGA 162, an LO mixer 164A for the I signal path, amplifier/filter circuitry 166A for the I signal path, an analog-to-digital converter (ADC) 168A for the I signal path, an LO mixer 164B for the Q signal path, amplifier/filter circuitry 166B for the Q signal path, and an ADC 168B for the Q signal path. The receiver baseband processor 180 includes an I/Q mismatch calibration unit 185. It is noted, however, that in other embodiments the transmitter unit 110 and the receiver unit 150 may include additional components, e.g., one or more additional VGAs, or some components may be omitted, e.g., the transmitter unit 110 and the receiver unit 150 may not include any VGAs.

In the example shown in FIG. 1, in the transmitter section, the loopback path 105 is coupled between the VGA 126 and the PA 128 of the transmitter AFE 120, and in the receiver section, the loopback path 105 is coupled between the LNA 161 and the VGA 162. It is noted, however, that in other implementations the loopback path 105 may be coupled to a different part of the circuitry of the transmitter AFE 120 and the receiver AFE 160. For example, the loopback path 105 may be coupled between the LO mixers 124 and the VGA 126 of the transmitter AFE 120, and between the VGA 162 and the LO mixers 164 of the receiver AFE 160. As illustrated, the loopback path 105 includes a loopback switch 115 and a phase shift circuit 125, which may be part of or separate from the transmitter unit 110 or the receiver unit 150 portions of the transceiver 100. The loopback switch 115, e.g., a transistor, is used to open the loopback path 105 during a normal mode of operation of the transceiver 100 (i.e., transmitting and receiving RF signals via a network), and close the loopback path 105 during a calibration mode of operation. In one example, the state of the loopback switch 115 may be controlled by the I/Q mismatch calibration unit 185 of the transceiver 100. It is noted, however, that in other examples, the loopback switch 115 can be controlled by other device components, e.g., a controller of the transceiver 100 (not shown) implemented in hardware and/or software. The phase shift circuit 125 is utilized during the I/Q mismatch calibration mode to add a phase shift to selected signals provided from the transmitter unit 110 to the receiver unit 150, as will be described further below. In one example, the phase shift circuit 125 includes a switch that is used to bypass the phase shift circuit 125.

During a calibration mode of operation, the loopback switch 115 is closed, and the transmitter unit 110 provides a first signal and a second signal to the receiver unit 150 via the loopback path 105, as noted at stage A. In one implementation, the phase shift unit 125 adds a phase shift to the second signal provided to the receiver unit 150, as noted at stage B. In one example, the transmitter unit 110 provides the first signal to the receiver unit 150 without intentionally adding a phase shift. In other words, for transmission of the first signal, the switch connected to the phase shift unit 125 may be opened to bypass the phase shift unit 125. In one example, the switch of the phase shift unit 125 may be opened and closed by the transmitter pre-distortion unit 145 or the I/Q mismatch calibration unit 185 or other control entity of the transceiver 100. After transmission of the first signal, in one example, the switch of the phase shift unit 125 is closed, and the transmitter unit 110 provides a second signal to the receiver unit 150 with a phase shift added by the phase shift unit 125, as will be described further below with reference to FIGS. 2-4. In some implementations, the first and second signals may be OFDM signals or pilot tones, e.g., generated by the transmitter baseband processor 140. It is noted, however, that in other implementations, the transmitter unit 110 may generate other types of signals for the calibration operations of the transceiver 100.

Furthermore, during the I/Q mismatch calibration operation, the receiver unit 150 determines a first set of I/Q measurements from the first signal and a second set of I/Q measurements from the second signal, as noted in stage C. For example, the receiver unit 150 determines measurements for both the I and Q components of the first signal, and measurements for both the I and Q components of the second signal with an added phase shift. The receiver unit 150 then calculates transmitter I/Q mismatch parameters and receiver I/Q mismatch parameters based on the first and second sets of I/Q measurements, as noted at stage D. For example, the receiver unit 150 calculates the transmitter gain mismatch, receiver gain mismatch, the transmitter phase mismatch, and the receiver gain mismatch. At stage E, the transmitter unit 110 is provided with the transmitter I/Q mismatch parameters. For example, the I/Q mismatch calibration unit 185 provides the transmitter pre-distortion unit 145 the calculated transmitter gain mismatch and transmitter phase mismatch to perform pre-distortion operations during normal operations, as will be further described below.

It should be noted that the components described with reference to FIG. 1 are meant to be exemplary only, and are not intended to limit the inventive subject matter to any specific set of components or configurations. For example, in various embodiments, one or more of the components described may be omitted, combined, modified, or additional components included, as desired. For instance, in some embodiments, the transceiver 100 may share a common antenna, or may have various additional antennas and transmitter/receiver chains. In some implementations, the transceiver 100 may include less or more filter and/or amplifier circuitry (e.g., blocks 122 and 166 of FIG. 1). In other implementations, the phase shift that is added to the second signal can be added by other techniques, e.g., by adding an offset to the phase of the local oscillator (LO) signals provided to the mixers 124, as will be described further below.

In various implementations, I/Q mismatch calibration may be performed at the transceiver 100 to improve (i.e., reduce) the error vector magnitude (EVM) associated with the transmitter unit 110 and the EVM associated with the receiver unit 150. The EVM is a measure of the performance of the transmitter unit 110 or the receiver unit 150, e.g., a high amount of gain imbalance and/or phase error at the output of the transmitter unit 110 can result in a high EVM for the transmitter unit. For example, a phase mismatch causes the I signal to leak to the Q signal, and vice versa, which leads to crosstalk between the subcarriers, and therefore errors. I/Q mismatch calibration may improve EVM by reducing the transmitter and receiver gain mismatch and phase mismatch that contribute to the EVM. For example, the phase mismatch EVM for the transmitter unit 110 or the receiver unit 150 can be represented by the following equation (Eq. 1).

$$EVM_{I/Q}(\text{dB}) = 10\log_{10}\left(\frac{\varepsilon^2}{4} + \frac{\Delta\theta^2}{4}\right) \quad \text{(Eq. 1)}$$

$\varepsilon$: gain mismatch normalized to nominal gain ($\Delta$gain/gain);
$\theta$: phase mismatch in radians.

As shown in the above equation (Eq. 1), a desired EVM may be achieved by reducing the gain mismatch and/or the phase mismatch. The I/Q mismatch calibration techniques described herein can help determine and reduce the transmitter gain and phase mismatch and the receiver gain and phase mismatch.

Figure 2:
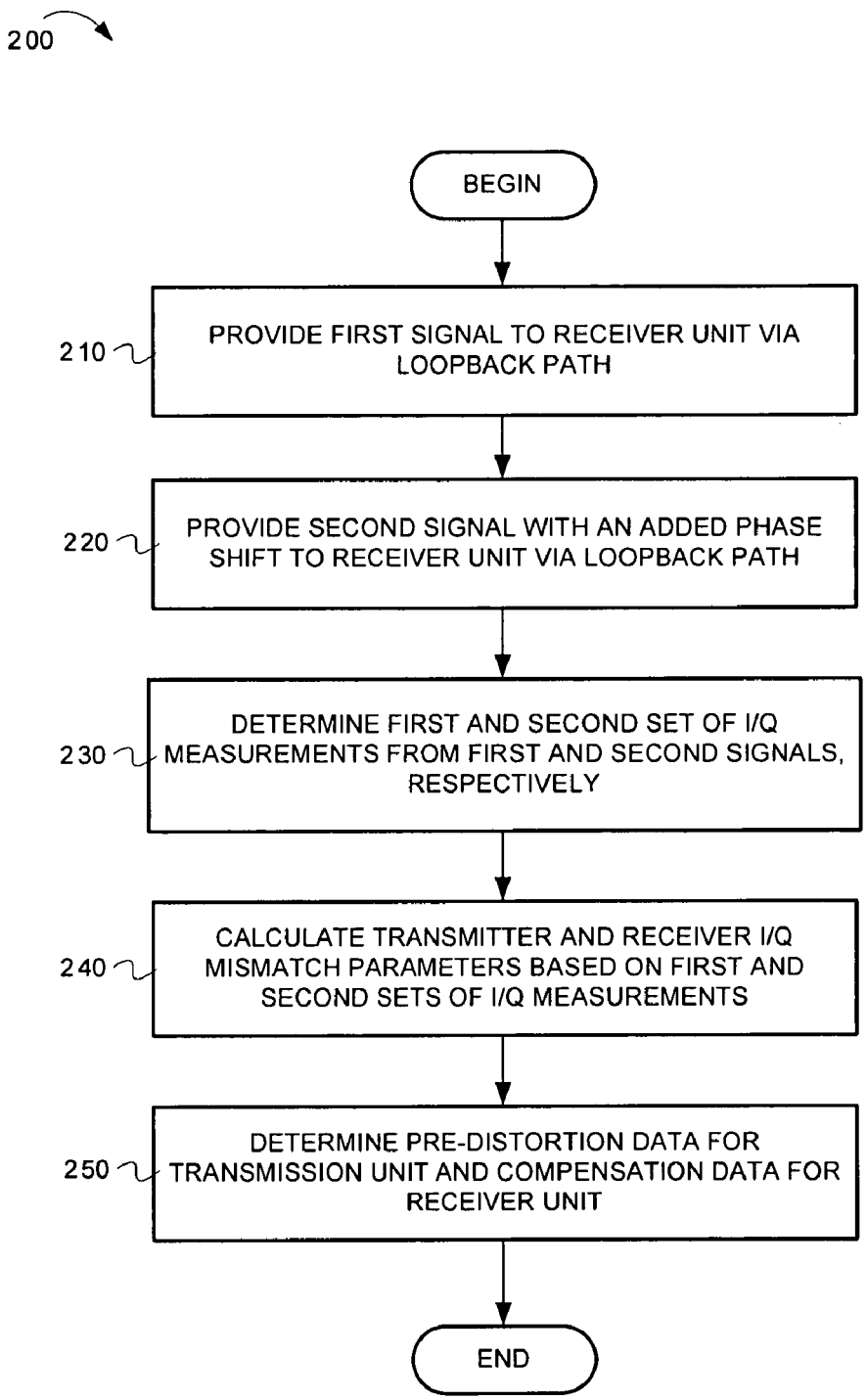
FIG. 2 is an example flow diagram of a method for performing I/Q mismatch calibration in a wireless communication device.

FIG. 2 is an example flow diagram 200 of a method for performing I/Q mismatch calibration in a wireless communication device. In block 210, during the I/Q mismatch calibration mode, the loopback switch 115 is closed, and a first signal is provided to the receiver unit 150 via the loopback path 105. In block 220, a second signal is provided to the receiver unit 150 via the loopback path 105. The transmitter unit 110 provides the first signal to the receiver unit 150, and provides the second signal to the receiver unit 150 with an added phase shift, e.g., added by the phase shift unit 125 (see FIG. 1). In one example, for transmission of the first signal, a switch connected to the phase shift circuit 125 may be opened to bypass the phase shift unit 125, and for the second signal, the switch connected to the phase shift circuit 125 may be closed to add a phase shift to the second signal via the phase shift unit 125. It is noted that the phase shift added by the phase shift unit 125 can be a known phase shift or an unknown phase shift. From block 220, the flow continues at block 230.

In block 230, during the I/Q mismatch calibration operation, a first set of I/Q measurements are determined from the first signal received at the receiver unit 150, and a second set of I/Q measurements are determined from the second signal received at the receiver unit 150. In one implementation, the receiver unit 150 determines measurements for both the I and Q components of the first signal, and measurements for both the I and Q components of the second signal with an added phase shift. The measurements of the receiver I and Q components of the first signal can be represented by the following equations (Eq. 2 and Eq. 3).

$$R_{I1} = G\left\{\left[I\left(1 + \frac{\varepsilon_T + \varepsilon_R}{2}\right) + Q\left(\frac{\Delta\theta_R + \Delta\theta_T}{2}\right)\right]\cos\varphi + \left[Q\left(1 - \frac{\varepsilon_T - \varepsilon_R}{2}\right) + I\left(\frac{\Delta\theta_T - \Delta\theta_R}{2}\right)\right]\sin\varphi\right\} \quad \text{(Eq. 2)}$$

-continued $$R_{Q1} = G\left\{\left[Q\left(1 - \frac{\varepsilon_T + \varepsilon_R}{2}\right) + I\left(\frac{\Delta\theta_R + \Delta\theta_T}{2}\right)\right]\cos\varphi - \left[I\left(1 + \frac{\varepsilon_T - \varepsilon_R}{2}\right) + Q\left(\frac{\Delta\theta_T - \Delta\theta_R}{2}\right)\right]\sin\varphi\right\} \quad \text{(Eq. 3)}$$

$R_{I1}$, $R_{Q1}$: RX I and Q components associated with first signal, respectively;

I, Q: TX I and Q components associated with first signal, respectively;

$\varepsilon_T$, $\varepsilon_R$: Gain mismatch normalized to nominal gain for TX and RX, respectively;

$\Delta\theta_T$, $\Delta\theta_R$: Phase mismatch in radians for TX and RX, respectively;

$\varphi$: Effective phase between TX and RX LO signals;

G: Gain from TX baseband to RX baseband through loopback path.

The measurements of the receiver I and Q components of the second signal (with phase shift $\varphi_{shift}$) can be represented by the following equations (Eq. 4 and Eq. 5).

$$R_{I2} = G\left\{\left[I\left(1 + \frac{\varepsilon_T + \varepsilon_R}{2}\right) + Q\left(\frac{\Delta\theta_R + \Delta\theta_T}{2}\right)\right]\cos(\varphi + \varphi_{shift}) + \left[Q\left(1 - \frac{\varepsilon_T - \varepsilon_R}{2}\right) + I\left(\frac{\Delta\theta_T - \Delta\theta_R}{2}\right)\right]\sin(\varphi + \varphi_{shift})\right\} \quad \text{(Eq. 4)}$$

$$R_{Q2} = G\left\{\left[Q\left(1 - \frac{\varepsilon_T + \varepsilon_R}{2}\right) + I\left(\frac{\Delta\theta_R + \Delta\theta_T}{2}\right)\right]\cos(\varphi + \varphi_{shift}) - \left[I\left(1 + \frac{\varepsilon_T - \varepsilon_R}{2}\right) + Q\left(\frac{\Delta\theta_T - \Delta\theta_R}{2}\right)\right]\sin(\varphi + \varphi_{shift})\right\} \quad \text{(Eq. 5)}$$

$R_{I2}$, $R_{Q2}$: RX I and Q components associated with second signal, respectively;

I, Q: TX I and Q components associated with second signal, respectively;

$\varepsilon_T$, $\varepsilon_R$: Gain mismatch normalized to nominal gain for TX and RX, respectively;

$\Delta\theta_T$, $\Delta\theta_R$: Phase mismatch in radians for TX and RX, respectively;

$\varphi + \varphi_{shift}$: Effective phase between TX and RX LO signals with added phase shift;

G: Gain from TX baseband to RX baseband through loopback path.

As shown above, the equations have six unknowns: $\varepsilon_T$, $\varepsilon_R$, $\theta_T$, $\theta_R$, $\varphi$, G. In some implementations, $\varphi_{shift}$ may also be unknown. The I/Q mismatch contributions from the transmitter unit 110 and the receiver unit 150 are combined together in the equations. If $\varphi$ and G (and $\varphi_{shift}$) are not considered for the moment, since they can be obtained using the techniques described below, the equations have four unknowns: the transmitter gain mismatch $\varepsilon_T$, the receiver gain mismatch $\varepsilon_R$, the transmitter phase mismatch $\theta_T$, and the receiver phase mismatch $\theta_R$. The first set of I/Q measurements, represented by the two equations Eq. 2 and Eq. 3, are obtained from the first signal sent from the transmitter unit 110 to the receiver unit 150 via the loopback path 105. To solve for the four unknown I/Q mismatch parameters, an additional independent measurement, i.e., the second set of I/Q measurements, represented by the two equations Eq. 4 and Eq.5, are obtained from the second signal with the phase shift $\varphi_{shift}$, for a total of four equations. From block 230, the flow continues at block 240.

At block 240, transmitter I/Q mismatch parameters and receiver I/Q mismatch parameters are calculated based on the first and second sets of I/Q measurements. For instance, in various implementations, the receiver unit 150 calculates the transmitter I/Q mismatch parameters: transmitter gain mismatch $\varepsilon_T$ and the transmitter phase mismatch $\theta_T$, and the receiver I/Q mismatch parameters: receiver gain mismatch $\varepsilon_R$ and receiver phase mismatch $\theta_R$, based on the equations Eq. 2, Eq. 3, Eq. 4, and Eq. 5 shown above. For example, the I/Q mismatch calibration unit 185 of the receiver unit 150 can solve for $\varepsilon_T$, $\varepsilon_R$, $\theta_T$, $\theta_R$ using the equations Eq. 2-Eq. 5.

In one implementation, the I/Q mismatch calibration unit 185 calculates the total magnitude and the difference in the magnitude of the I and Q components associated with both the first signal and the second signal received at the receiver unit 150 for cross-correlation purposes, as shown in the following equations (Eq. 6, Eq. 7, Eq. 8, and Eq. 9).

$$\frac{\overline{R_{I1}^2(t)} - \overline{R_{Q1}^2(t)}}{\overline{R_{I1}^2(t)} + \overline{R_{Q1}^2(t)}} = \varepsilon_T\cos 2\varphi + \varepsilon_R + \theta_T\sin 2\varphi \quad \text{(Eq. 6)}$$

$$\frac{2\overline{R_{I1}(t)R_{Q1}(t)}}{\overline{R_{I1}^2(t)} + \overline{R_{Q1}^2(t)}} = -\varepsilon_T\sin 2\varphi + \theta_T\cos 2\varphi + \theta_R \quad \text{(Eq. 7)}$$

$$\frac{\overline{R_{I2}^2(t)} - \overline{R_{Q2}^2(t)}}{\overline{R_{I2}^2(t)} + \overline{R_{Q2}^2(t)}} = \varepsilon_T\cos 2(\varphi + \varphi_{shift}) + \varepsilon_R + \theta_T\sin 2(\varphi + \varphi_{shift}) \quad \text{(Eq. 8)}$$

$$\frac{2\overline{R_{I2}(t)R_{Q2}(t)}}{\overline{R_{I2}^2(t)} + \overline{R_{Q2}^2(t)}} = -\varepsilon_T\sin 2(\varphi + \varphi_{shift}) + \theta_T\cos 2(\varphi + \varphi_{shift}) + \theta_R \quad \text{(Eq. 9)}$$

As shown above, after calculating the total magnitude and difference in magnitude of the measurements, the gain (G), i.e., the gain from TX baseband to RX baseband through the loopback path, shown in the equations Eq. 2-Eq. 5 is divided away, and, after simplification, the four equations shown above (Eq. 6-Eq. 9) are derived. Furthermore, by introducing a fixed I/Q mismatch parameter, e.g., $\Delta\theta_T$, to the TX baseband and re-measuring $R_{I1}$, $R_{Q1}$, $R_{I2}$, and $R_{Q2}$, the cos $2\varphi$, sin $2\varphi$, cos $2(\varphi+\varphi_{shift})$, and sin $2(\varphi+\varphi_{shift})$ values can independently be derived from the above equations (Eq. 6-Eq. 9). In one example, the I/Q mismatch calibration unit 185 can introduce the fixed I/Q mismatch parameter, e.g., $\Delta\theta_T$, to the TX baseband via the transmitter pre-distortion unit 145. After determining the cos $2\varphi$, sin $2\varphi$, cos $2(\varphi+\varphi_{shift})$, and sin $2(\varphi+\varphi_{shift})$ values, the result of these measurements is four linear equations with four unknown I/Q mismatch parameters, i.e., the transmitter gain mismatch $\varepsilon_T$, the receiver gain mismatch $\varepsilon_R$, the transmitter phase mismatch $\theta_T$, and the receiver phase mismatch $\theta_R$. The I/Q mismatch calibration unit 185 then solves for the four unknown I/Q mismatch parameters, e.g., using matrices based on the four linear equations. From block 240, the flow continues at block 250.

After solving for the four unknown I/Q mismatch parameters, in block 250, signal pre-distortion data is determined for the transmission unit 110 and signal compensation data is determined for the receiver unit 150. Specifically, it is determined how much to pre-distort signals to be processed and transmitted by the transmitter unit 110 based on the derived transmitter gain mismatch $\varepsilon_T$ and the transmitter phase mismatch $\theta_T$ parameters to compensate for the I/Q mismatch at the transmitter unit 110. Also, it is determined how much to compensate the signals to be received and processed at the receiver unit 150 based on the derived receiver gain mismatch $\varepsilon_R$ and the receiver phase mismatch $\theta_R$ to account for the I/Q mismatch at the receiver unit 150. For example, the I/Q mismatch calibration unit 185 of the receiver unit 150 provides the derived transmitter gain mismatch $\varepsilon_T$ and the transmitter phase mismatch $\theta_T$ parameters to the transmitter pre-distortion unit 145 of the transmitter unit 110. The transmitter pre-distortion unit 145 may determine how to pre-distort signals to be transmitted by the transmitter unit 110 based on the derived transmitter I/Q mismatch parameters and the desired EVM. For example, if an EVM of −36 dB is desired, the pre-distortion unit 145 may determine how much to pre-distort a signal with respect to gain and phase, based on the derived transmitter gain mismatch $\epsilon_T$ and the transmitter phase mismatch $\theta_T$ parameters (and Eq. 1), in order to achieve the desired EVM (or achieve a lower EVM). It is noted that in other implementations, the I/Q mismatch calibration unit 185 may determine how much to pre-distort signal in the transmitter unit 110 and may program the transmitter pre-distortion unit 145 accordingly to achieve the desired EVM. Similarly, the I/Q mismatch calibration unit 185 can determine how much to compensate signals received at the receiver unit 150 based on a desired EVM and on the derived receiver gain mismatch $\epsilon_R$ and the receiver phase mismatch $\theta_R$.

It is noted that the I/Q mismatch calibration operations can be performed periodically, randomly, during pre-programmed time periods, and/or during idle time periods when the wireless communication device is not processing RF traffic. Furthermore, it is noted that the I/Q mismatch calibration processes described above with reference to FIGS. 1-2 can be repeated one or more times during a calibration mode until the desired calibration results have been achieved, e.g., until the desired EVM has been met.

It is noted that the I/Q mismatch parameters, i.e., the transmitter gain mismatch $\epsilon_T$, the receiver gain mismatch $\epsilon_R$, the transmitter phase mismatch $\theta_T$, and the receiver phase mismatch $\theta_R$, can be derived by various techniques using measurements obtained from the first signal and the second signal having an added phase shift. For instance, in another implementation, the TX baseband processor 140 can apply DC values for the TX I and Q components of the signals that are transmitted to the receiver unit 150 via the loopback path 105. In one example, using the equations Eq. 2-Eq. 5, for a first set of I/Q measurements $R_{I1}$, $R_{Q1}$ associated with a first signal, the TX I component is set equal to a DC value of A and the TX Q component is set equal to 0. In this example, for a second set of I/Q measurements $R_{I2}$, $R_{Q2}$ associated with a second signal, the TX I component is set equal to 0 and the TX Q component is set equal to a DC value of A. Additionally, in this example, for a third set of I/Q measurements $R_{I3}$, $R_{Q3}$ associated with a third signal, the TX I component is set equal to a DC value of A, the TX Q component is set equal to 0, and $\phi$ is set equal to $\phi+\phi_{shift}$. Furthermore, in this example, for a fourth set of measurements $R_{I4}$, $R_{Q4}$ associated with a fourth signal, the TX I component is set equal to 0, the TX Q component is set equal to a DC value of A, and $\phi$ is set equal to $\phi+\phi_{shift}$. As a result of these measurements, the following four equations (Eq. 10-Eq. 13) can be derived. Similar to the techniques described above, these equations can be used to obtain the transmitter gain mismatch $\epsilon_T$, the receiver gain mismatch $\epsilon_R$, the transmitter phase mismatch $\theta_T$, and the receiver phase mismatch $\theta_R$, as long as $\phi$ and $\phi+\phi_{shift}$ are not equal to (or relatively close to) values that cause inaccuracies due to the tangent function in Eq. 10-Eq. 13 approaching infinity, e.g., when either $\phi$ or $\phi+\phi_{shift}$ is equal to (or approximately equal to) 90 degrees. It is noted that Eq. 6-Eq. 9 do not have this phase value restriction since Eq. 6-Eq. 9 do not include the tangent function.

$$\epsilon_T + \epsilon_R + (\Delta\theta_T - \Delta\theta_R)\tan\phi \quad\quad\quad (\text{Eq. 10})$$

$$\epsilon_T - \epsilon_R - \frac{(\Delta\theta_T + \Delta\theta_R)}{\tan\varphi} \quad\quad\quad (\text{Eq. 11})$$

$$\epsilon_T + \epsilon_R - (\Delta\theta_T - \Delta\theta_R)\tan(\phi+\phi_{shift}) \quad\quad\quad (\text{Eq. 12})$$

$$\epsilon_T - \epsilon_R - \frac{(\Delta\theta_T + \Delta\theta_R)}{\tan(\varphi + \varphi_{shift})} \quad\quad\quad (\text{Eq. 13})$$

Figure 3:
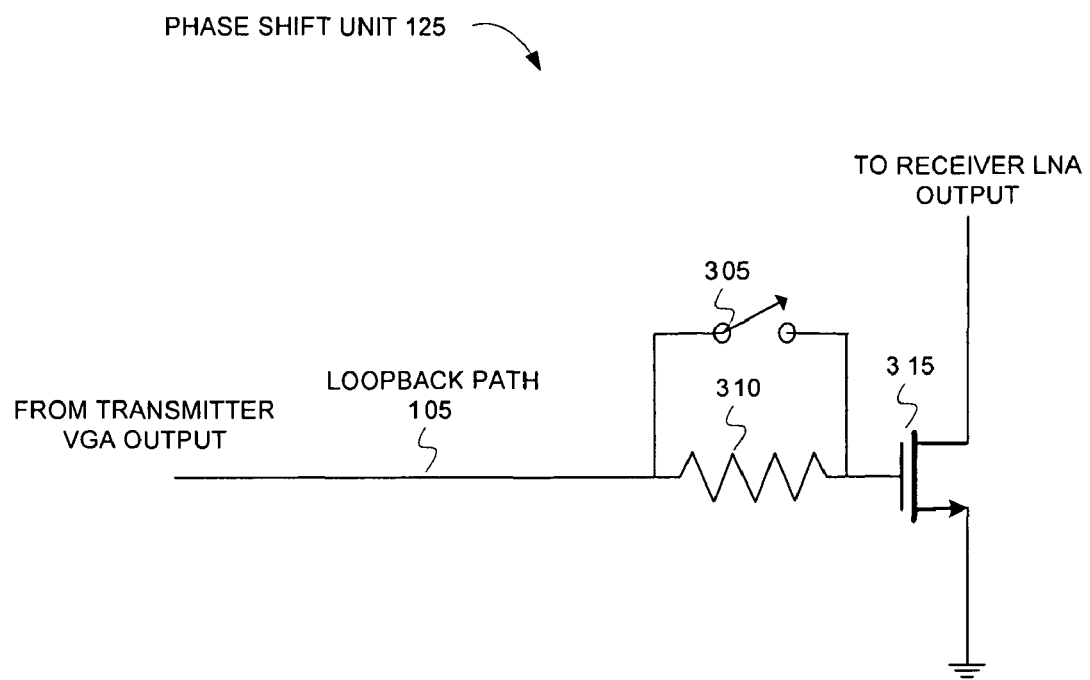
FIG. 3 is an example circuit diagram of the phase shift unit.

FIG. 3 is an example circuit diagram of the phase shift unit 125. In one implementation, the phase shift unit 125 can be included in the transmitter unit 110 within the loopback path 105 connecting the transmitter unit 110 to the receiver unit 150 (see FIG. 1). As shown in the example of FIG. 3, the phase shift unit 125 includes a bypass switch 305, a resistor 310, and a transistor 315. In one example, the transistor 315 can be an NMOS transistor. In various implementations, the phase shift unit 125 can be enabled by a controlling entity (e.g., the transmitter pre-distortion unit 145 or the I/Q mismatch calibration unit 185) during I/Q mismatch calibration in order to add a phase shift to selected signals provided from the transmitter unit 110 to the receiver unit 150 via the loopback path 105, e.g., as described further below with reference to FIG. 4.

Figure 4:
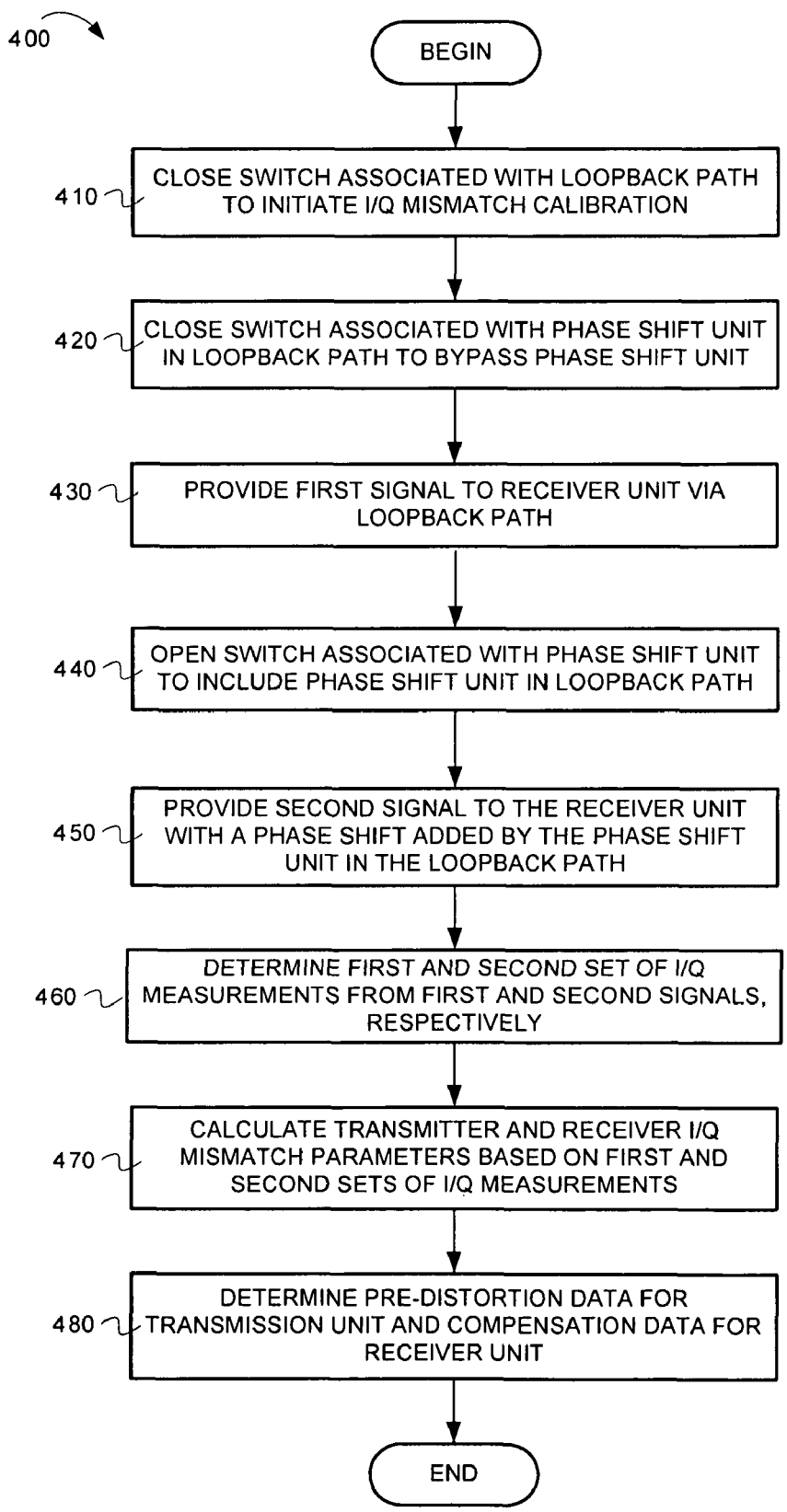
FIG. 4 is another example flow diagram of a method for performing I/Q mismatch calibration in a wireless communication device.

FIG. 4 is another example flow diagram 400 of a method for performing I/Q mismatch calibration in a wireless communication device. Referring collectively to FIGS. 1-4, at block 410, the loopback path switch 115 associated with the loopback path 105 is closed to configure the transceiver 100 for I/Q mismatch calibration operations. At block 420, the bypass switch 305 of the phase shift unit 125 is closed to bypass the phase shift unit 125 in the loopback path 105. At block 430, a first signal is provided to the receiver unit 150 via the loopback path 105. Since the bypass switch 305 is closed, the first signal bypasses the phase shift unit 125. At block 440, the bypass switch 305 of the phase shift unit 125 is opened to include the phase shift unit 125 in the loopback path 105. At block 450, a second signal is provided to the receiver unit 150 via the loopback path. Since the bypass switch 305 is open, the phase shift unit 125 adds a phase shift to the second signal. In one implementation, the phase shift unit 125 can be designed such that the pole associated with the resistor 310 and the gate capacitor of the transistor 315 is at a predetermined frequency to obtain a desired phase shift. For example, if the pole associated with the resistor 310 and the gate capacitor of the transistor 315 is at approximately the RF carrier frequency, a phase shift of approximately 45 degrees may be added to the second signal. It is noted, however, that the phase shift unit 125 may have any suitable design to add a phase shift to selected signals during I/Q mismatch calibration.

At block 460, first and second sets of I/Q measurements are determined from the first and second signals, respectively. At block 470, transmitter and receiver I/Q mismatch parameters are calculated based on the first and second sets of I/Q measurements. At block 480, pre-distortion data is determined for transmission unit 110 and compensation data is determined for the receiver unit 150. It is noted that, in blocks 460-480, the first and second signals may be processed using similar techniques as described above with reference to FIGS. 1-2.

It is noted, however, that a phase shift may be added to the second signal by various other techniques. For instance, in one implementation, the phase of the transmitter local oscillator (LO) signal, which is provided to both mixer 124A (i.e., LO (I)) and mixer 124B (i.e., LO (Q)) shown in FIG. 1, is offset prior to being provided to the mixers 124A and B. By changing the phase of the transmitter LO signal when the transmitter unit 110 is processing the second signal, a phase shift is added to the second signal, e.g., at the mixers 124A and B, which allows the receiver unit 150 to determine a second set of I/Q measurements for calculating the transmitter and receiver I/Q mismatch parameters, as was described above. In one example, a voltage-controlled oscillator (VCO) may generate the transmitter LO signal (or a multiple of the LO signal) that is provided to the mixers 124A and B. In this example, when the transmitter unit 110 is processing the second signal, the phase of the output of the VCO may be offset prior to being provided to the mixers 124A and B in order to add a phase shift to the second signal.

After the I/Q mismatch calibration operations have been completed, the I/Q mismatch calibration unit 185 (or another controlling entity) may open the loopback path switch 115 to open the loopback path 105 between the transmitter unit 110 and the receiver unit 150. The transceiver 100 may then enter a normal mode of operation processing wireless traffic, i.e., the transmitter unit 110 transmitting RF signals and the receiver unit 150 receiving RF signals via a network (e.g., WLAN). During the normal operational mode, the pre-distortion unit 145 of the transmitter unit 110 pre-distorts the signals being processed by the transmitter unit 110 based on the transmitter I/Q mismatch parameters calculated during the I/Q mismatch calibration mode to compensate for I/Q mismatch at the transmitter unit 110. Furthermore, during the normal operational mode, the I/Q mismatch calibration unit 185 of the receiver unit 150 processes signals received by the receiver unit 150 based on the receiver I/Q mismatch parameters calculated during the I/Q mismatch calibration mode to compensate for I/Q mismatch at the receiver unit 150. It is noted that in some implementations the pre-distortion unit 145 of the transmitter unit 110 and the I/Q mismatch calibration unit 185 of the receiver unit 150 can simultaneously compensate for the I/Q mismatch at the transmitter unit and the receiver unit, respectively.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, during a calibration mode, the calibration processes described above with reference to FIG. 2 or FIG. 4 may be repeated one or more times until the desired calibration results have been achieved, e.g., until the desired EVM has been met.

Figure 5:
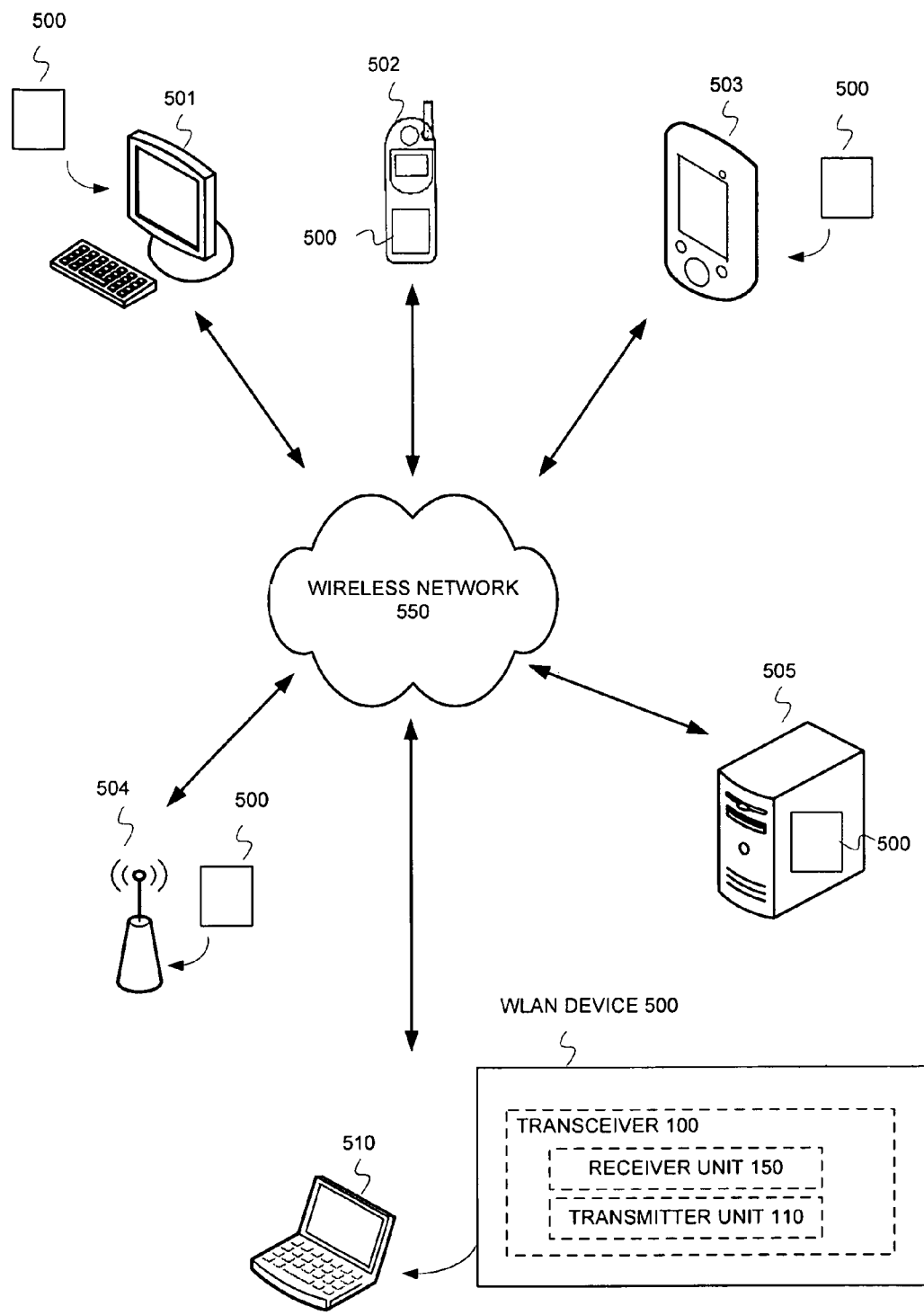
FIG. 5 is a conceptual diagram of an example wireless communication system.

FIG. 5 is a conceptual diagram of an example wireless communication system. As illustrated, the communication system may include a plurality of communication devices, such as a personal computer (PC) 501, mobile phone 502, a global positioning system (GPS) device 503, a WLAN access point 504, a server 505 (e.g., accessible via the Internet), and a laptop 510, transmitting and receiving information via a wireless communication network 550. In various implementations, the communication devices comprise a WLAN device 500 including a transceiver (e.g., the transceiver 100 of FIG. 1) that is configured to transmit and receive WLAN signals. The transceiver 100 also implements (via software and/or hardware) some or all of the operations and features described above with reference to FIGS. 1-4. For example, the transceiver 100 may perform I/Q mismatch calibration operations.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
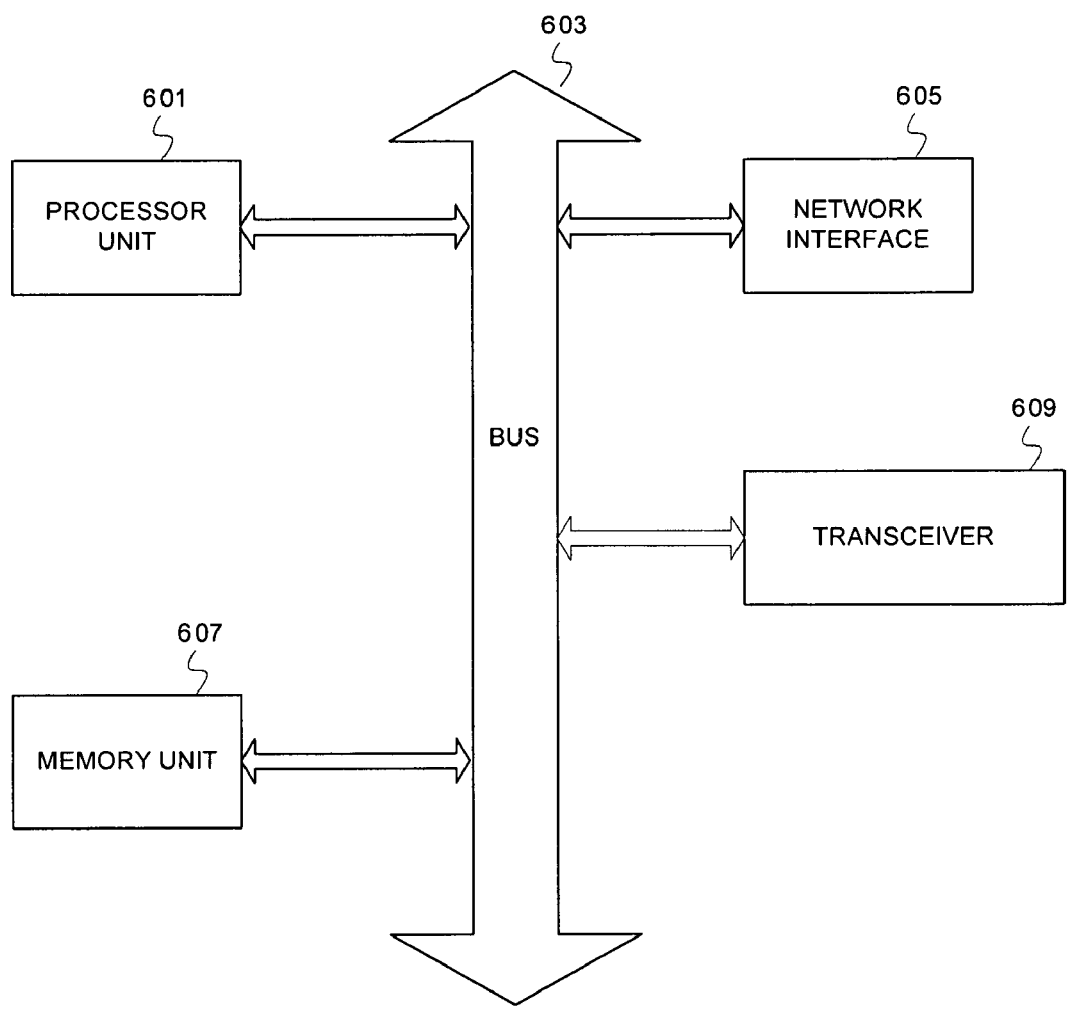
FIG. 6 is an example block diagram of a wireless device.

FIG. 6 is an example block diagram of a wireless device. In one implementation, the wireless device may be a WLAN device (e.g., the WLAN device 500 of FIG. 5). The WLAN device includes a processor unit 601 (possibly including multiple processors, multiple cores, multiple nodes, and/or implementing multi-threading, etc.). The WLAN device includes memory unit 607. The memory unit 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The WLAN device also includes a bus 603 (e.g., PCI, ISA, PCI-Express, HyperTransport®, InfiniBand, NuBus, etc.), and network interfaces 605 that include at least one wireless network interface (e.g., a WLAN interface, a Bluetooth® interface, a WiMAX interface, a ZigBee® interface, a Wireless USB interface, etc.). The WLAN device also includes a transceiver 609 that implements the functionalities described above with reference to FIGS. 1-4. Any one of the above described functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., additional network interfaces, peripheral devices, etc.). The processor unit 601 and the network interfaces 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, the I/Q mismatch calibration techniques as described herein may be implemented with facilities consistent with any hardware system or systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for performing I/Q mismatch calibration in a wireless communication device comprising a receiver unit and a transmitter unit, the method comprising:

during an I/Q mismatch calibration mode, providing a first signal from the transmitter unit to the receiver unit of the wireless communication device via a loopback path coupled between the transmitter unit and receiver unit, wherein said providing the first signal comprises closing a bypass switch of a phase shift unit in the loopback path to bypass the phase shift unit in the loopback path when the first signal is provided to the receiver unit during the I/Q mismatch calibration mode;

during the I/Q mismatch calibration mode, providing a second signal from the transmitter unit to the receiver unit of the wireless communication device via the loopback path coupled between the transmitter unit and receiver unit, wherein said providing the second signal to the receiver unit comprises opening the bypass switch of the phase shift unit in the loopback path to add the phase shift to the second signal via the phase shift unit when the second signal is provided to the receiver unit during the I/Q mismatch calibration mode;

determining a first set of I/Q measurements from the first signal and a second set of I/Q measurements from the second signal with the added phase shift;

calculating transmitter I/Q mismatch parameters and receiver I/Q mismatch parameters based on the first and second sets of I/Q measurements; and programming the transmitter unit to compensate for I/Q mismatch at the transmitter unit based on the transmitter I/Q mismatch parameters and programming the receiver unit to compensate for I/Q mismatch at the receiver unit based on the receiver I/Q mismatch parameters.

2. The method of claim 1, further comprising:

during a normal operational mode, pre-distorting signals that are processed by the transmitter unit based on the transmitter I/Q mismatch parameters to compensate for I/Q mismatch at the transmitter unit; and during the normal operational mode, processing signals received by the receiver unit based on the receiver I/Q mismatch parameters to compensate for I/Q mismatch at the receiver unit.

3. The method of claim 2, wherein said pre-distorting signals being processed by the transmitter unit based on the transmitter I/Q mismatch parameters to compensate for I/Q mismatch at the transmitter unit comprises determining pre-distortion data based on the transmitter I/Q mismatch parameters and programming a pre-distortion unit in the transmitter unit to pre-distort signals according to the pre-distortion data to compensate for I/Q mismatch at the transmitter unit.

4. The method of claim 2, wherein, during the normal operational mode, transmitting and receiving RF signals via the transmitter unit and the receiver unit, respectively, and during the I/Q mismatch calibration mode, performing I/Q mismatch calibration.

5. The method of claim 1, further comprising closing a loopback path switch coupling the transmitter unit to the receiver unit to configure the wireless communication device for the I/Q mismatch calibration mode.

6. The method of claim 1, wherein said adding the phase shift to the second signal comprises adding an offset to a phase of a local oscillator (LO) signal provided to an in-phase signal mixer and to a quadrature signal mixer of the transmitter unit that process the second signal in order to add the phase shift to the second signal.

7. The method of claim 1, wherein the transmitter I/Q mismatch parameters include a transmitter phase mismatch parameter and a transmitter gain mismatch parameter, and the receiver I/Q mismatch parameters include a receiver phase mismatch parameter and a receiver gain mismatch parameter.

8. The method of claim 1, further comprising programming the transmitter unit to compensate for I/Q mismatch at the transmitter unit based on the transmitter I/Q mismatch parameters and based on a predefined maximum error vector magnitude (EVM) associated with the transmitter unit, and programming the receiver unit to compensate for I/Q mismatch at the receiver unit based on the receiver I/Q mismatch parameters and based on a predefined maximum EVM associated with the receiver unit.

9. A communication device comprising:

a transmitter unit operable to transmit RF signals via a network;

a receiver unit operable to receive RF signals via the network, wherein the receiver unit comprises an I/Q mismatch calibration unit; and a loopback path coupled between the transmitter unit and the receiver unit;

wherein, during an I/Q mismatch calibration mode, the transmitter unit is operable to:

provide a first signal to the receiver unit via the loopback path, wherein the transmitter unit is operable to close a bypass switch of a phase shift unit in the loopback path to bypass the phase shift unit in the loopback path when the first signal is provided to the receiver unit during the I/Q mismatch calibration mode;

provide a second signal to the receiver unit via the loopback path, wherein the transmitter unit is operable to open the bypass switch of the phase shift unit in the loopback path to add the phase shift to the second signal via the phase shift unit when the second signal is provided to the receiver unit during the I/Q mismatch calibration mode;

wherein the I/Q mismatch calibration unit of the receiver unit is operable to,
  determine a first set of I/Q measurements from the first signal and a second set of I/Q measurements from the second signal with the added phase shift;
  calculate transmitter and receiver I/Q mismatch parameters based on the first and second sets of I/Q measurements; and
wherein, during a normal operational mode, the I/Q mismatch calibration unit of the receiver unit is further operable to determine pre-distortion data based on the transmitter I/Q mismatch parameters and program a pre-distortion unit of the transmitter unit with the pre-distortion data, and the pre-distortion unit is operable to pre-distort signals that are processed by the transmitter unit based on the pre-distortion data to compensate for I/Q mismatch at the transmitter unit.

10. The communication device of claim 9, wherein, during a normal operational mode, the I/Q mismatch calibration unit is operable to process signals received by the receiver unit based on the receiver I/Q mismatch parameters to compensate for I/Q mismatch at the receiver unit.

11. The communication device of claim 10, wherein the transmitter unit comprises a loopback path switch coupled to the loopback path, wherein the I/Q mismatch calibration unit is operable to close the loopback path switch coupling the transmitter unit to the receiver unit to configure the wireless communication device for the I/Q mismatch calibration mode.

12. The communication device of claim 9, wherein the transmitter unit comprises an in-phase signal mixer and to a quadrature signal mixer, wherein the transmitter unit is operable to add the phase shift to the second signal by adding an offset to a phase of a local oscillator (LO) signal provided to the in-phase signal mixer and to the quadrature signal mixer that process the second signal.

13. The communication device of claim 9, wherein the transmitter I/Q mismatch parameters include a transmitter phase mismatch parameter and a transmitter gain mismatch parameter, and the receiver I/Q mismatch parameters include a receiver phase mismatch parameter and a receiver gain mismatch parameter.

14. The communication device of claim 9, wherein the I/Q mismatch calibration unit of the receiver unit is further operable to determine pre-distortion data based on the transmitter I/Q mismatch parameters and based on a predefined maximum error vector magnitude (EVM) associated with the transmitter unit, and program the pre-distortion unit of the transmitter unit to pre-distort signals according to the pre-distortion data to compensate for I/Q mismatch at the transmitter unit.

15. One or more non-transitory machine-readable storage media, having instructions stored therein, which when executed by one or more processors causes the one or more processors to perform operations that comprise:
  during an I/O mismatch calibration mode, providing a first signal from a transmitter unit to a receiver unit of a wireless communication device via a loopback path coupled between the transmitter unit and receiver unit, wherein said providing the first signal comprises closing a bypass switch of a phase shift unit in the loopback path to bypass the phase shift unit in the loopback path when the first signal is provided to the receiver unit during the I/O mismatch calibration mode; during the I/O mismatch calibration mode, providing a second signal from the transmitter unit to the receiver unit of the wireless communication device via the loopback path coupled between the transmitter unit and receiver unit, wherein said providing the second signal to the receiver unit comprises opening the bypass switch of the phase shift unit in the loopback path to add the phase shift to the second signal via the phase shift unit when the second signal is provided to the receiver unit during the I/O mismatch calibration mode, wherein said adding the phase shift to the second signal comprises adding an offset to a phase of a local oscillator (LO) signal provided to an in-phase signal mixer and to a quadrature signal mixer a pair of I/O mixers of the transmitter unit that process the second signal in order to add the phase shift to the second signal;
  determining a first set of I/O measurements from the first signal and a second set of I/O measurements from the second signal with the added phase shift;
  calculating transmitter I/O mismatch parameters and receiver I/O mismatch parameters based on the first and second sets of I/O measurements; and
  during a normal operational mode, pre-distorting signals that are processed by the transmitter unit based on the transmitter I/O mismatch parameters to compensate for I/O mismatch at the transmitter unit.

16. The non-transitory machine-readable storage media of claim 15, wherein the operations further comprise, during a normal operational mode, processing signals received by the receiver unit based on the receiver I/O mismatch parameters to compensating for I/O mismatch at the receiver unit.

* * * * *